United States Patent
Son et al.

(10) Patent No.: US 11,628,763 B2
(45) Date of Patent: Apr. 18, 2023

(54) VEHICLE INCLUDING ELECTRIC MOTOR AND METHOD OF CONTROLLING BRAKE LAMP FOR THE SAME

(71) Applicants: Hyundai Motor Company, Seoul (KR); Kia Motors Corporation, Seoul (KR)

(72) Inventors: Hui Un Son, Gyeonggi-do (KR); Sang Joon Kim, Seoul (KR); Sung Hoon Yu, Gyeonggi-do (KR); Joo Young Kim, Gyeonggi-do (KR); Kyu Hwan Jo, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 349 days.

(21) Appl. No.: 17/109,776

(22) Filed: Dec. 2, 2020

(65) Prior Publication Data
US 2021/0354621 A1     Nov. 18, 2021

(30) Foreign Application Priority Data
May 14, 2020   (KR) ........................ 10-2020-0057498

(51) Int. Cl.
| | |
|---|---|
| *B60Q 1/44* | (2006.01) |
| *B60W 30/18* | (2012.01) |
| *B60Q 1/30* | (2006.01) |
| *B60L 7/18* | (2006.01) |

(52) U.S. Cl.
CPC ................. *B60Q 1/44* (2013.01); *B60L 7/18* (2013.01); *B60Q 1/302* (2013.01); *B60W 30/18127* (2013.01)

(58) Field of Classification Search
CPC .... B60Q 1/44; B60Q 1/302; B60Q 2300/114; B60L 7/18; B60L 15/2009; B60L 2240/16; B60L 2240/26; B60L 2250/18; B60L 2250/20; B60L 2250/26; B60L 2260/24; B60L 2260/26; B60L 2260/44; B60L 15/20; B60L 2240/14; B60L 2250/28; B60W 30/18127; B60W 10/08; B60W 40/09; B60W 2050/0024; B60W 2530/10; B60W 2540/10; B60W 2540/12; B60W 2710/083; B60W 2720/106; B60W 40/13;
(Continued)

(56) References Cited

U.S. PATENT DOCUMENTS

| | | | |
|---|---|---|---|
| 8,587,424 B2 * | 11/2013 | Aberizk | ................. B60Q 1/302 701/99 |
| 9,013,292 B2 | 4/2015 | Aberizk | |
| 9,511,710 B2 | 12/2016 | Aberizk | |

(Continued)

*Primary Examiner* — Omar Casillashernandez
(74) *Attorney, Agent, or Firm* — Fox Rothschild LLP

(57) ABSTRACT

A vehicle including an electric motor has improved operating performance of a brake lamp using regenerative braking. A method of controlling a brake lamp of the vehicle includes determining a tendency of a driver, calculating a corrected mass based on the determined tendency of the driver, and calculating corrected acceleration based on the corrected mass and regenerative braking torque of the electric motor. An on threshold is corrected based on a difference between a requested torque and the regenerative braking torque at a time at which an accelerator pedal is released, and the brake lamp is turned on based on the corrected on threshold and the corrected acceleration.

19 Claims, 7 Drawing Sheets

(58) Field of Classification Search
CPC .... B60W 2540/30; Y02T 10/64; Y02T 10/72; B60T 8/3205; B60T 2270/60; B60Y 2200/91
USPC ......................................................... 340/479
See application file for complete search history.

(56) References Cited

U.S. PATENT DOCUMENTS

| | | | | |
|---|---|---|---|---|
| 2015/0175061 | A1* | 6/2015 | Mizui | H02P 3/14 |
| | | | | 315/77 |
| 2017/0015202 | A1* | 1/2017 | Bryan | B60K 6/445 |
| 2022/0097533 | A1* | 3/2022 | Treharne | B60L 15/2063 |

* cited by examiner

VEHICLE INCLUDING ELECTRIC MOTOR AND METHOD OF CONTROLLING BRAKE LAMP FOR THE SAME

CROSS-REFERENCE TO RELATED APPLICATION(S)

This application claims the benefit of Korean Patent Application No. 10-2020-0057498, filed on May 14, 2020, which is hereby incorporated by reference as if fully set forth herein.

BACKGROUND

Field of the Disclosure

The present disclosure relates to a vehicle including an electric motor having improved operating performance of a brake lamp through regenerative braking and a method of controlling a brake lamp for the vehicle.

Discussion of the Related Art

Coasting refers to a vehicle continuously traveling using inertia, whereby the vehicle travels without output of driving force, and in general, coasting refers to driving in a state in which neither an accelerator pedal (APS=0) nor a brake pedal (BPS=0) is manipulated. The torque applied to a drive shaft during coasting may be referred to as inertia torque or coasting torque. In a general internal combustion engine vehicle, idle torque of an engine is also transmitted to a drive shaft through a torque converter and a transmission in a state in which the APS and the BPS are not engaged. This is also referred to as creep torque.

During coasting, this creep torque is transferred to the drive shaft by an engine, and simultaneously, a driving load based on a vehicle speed is applied in the direction opposite to that of the creep torque, and in this regard, coasting torque is configured as the total of the two, which will be described with reference to FIG. 1. FIG. 1 is a diagram showing an example of the relationship between coasting torque and vehicle speed during coasting of a general vehicle according to the prior art.

Referring to FIG. 1, since a transmission is generally in a low stage during a low vehicle speed, when the speed at an input end of the transmission is less than an idle RPM of an engine, the idle torque of the engine is transferred, and a vehicle travels forward due to this creep torque. In contrast, since a transmission is in a relatively high stage during a high vehicle speed, when the speed at the input end of the transmission is greater than the idle RPM of the engine, drag based on fuel cut of the engine is transferred, and coasting torque is generated.

Recently, with increased interest in the environment, there has been a great deal of research on hybrid electric vehicles (HEV) and electric motors, which use an electric motor as a driving source. In a vehicle including such an electric motor, an engine is not present or is not always operating, and thus creep torque from an engine is not generated. However, generally, a motor for generating creep torque is operated to mimic the characteristics of a general internal combustion engine.

Accordingly, in a vehicle including an electric motor, similarly to FIG. 1, forward torque based on idle momentum and the torque-increasing effect of a torque converter of an internal combustion engine in the case of a low speed is illustrated, and reverse torque based on the drag of an engine in which fuel injection is stopped in the case of a high speed is illustrated. In particular, the area in which the forward torque appears may be referred to as a creep area, and the area in which the reverse torque appears may be referred to as a coasting area. The reverse torque may be embodied by regenerative braking.

In a vehicle having an electric motor as a power source, such as a hybrid vehicle (HEV) or an electric vehicle (EV), a motor in addition to a conventional hydraulic friction brake is operated by a generator during braking, and thus, the kinetic energy of a vehicle is converted into electrical energy to enable the vehicle to brake, and this manner of braking is referred to as regenerative braking. Some currently released eco-friendly vehicles have a function of achieving an interest in driving and simultaneously enhancing real-world fuel efficiency by varying a regenerative braking amount, i.e., a coasting level using a paddle shift lever.

FIG. 2 is a diagram for explaining the concept of a general coasting level according to the prior art. FIG. 2 shows the relationship between the vehicle speed and the total torque applied to the drive shaft shown in FIG. 1 for each of five different coasting torque courses. In particular, when a regenerative braking amount is increased by one stage by pulling a paddle shift lever once to a side '−', vehicle deceleration is increased, and when a regenerative braking amount is reduced by pulling a paddle shift lever once to a side '+', vehicle deceleration is reduced. Thus, when a coasting level is increased or a vehicle speed is reduced, abrupt deceleration occurs in a vehicle due to regenerative braking.

There is technology that is referred to as one-pedal driving which is enabled when an electronic gear shift is positioned at a specific position and by which acceleration and deceleration are adjustable by engaging only an accelerator pedal without manipulation of a brake pedal, and it is possible to stop a vehicle by completely removing the foot from or disengaging the accelerator pedal. The present function also uses deceleration through regenerative braking.

However, recently, as the number of vehicles that generate deceleration through regenerative braking, that is, eco-friendly vehicles, has increased, regulations pertaining to illumination of a brake lamp depending on deceleration have been enacted. In particular, according to the clause 5.2.22.4 of the regulation ECE R-13H, in the case of a vehicle employing an electronic regenerative braking device (e-Braking) for generating retarding force when an accelerator pedal is released, a brake lamp is required to be turned on or off based on a vehicle deceleration value as defined in Table 1 below.

TABLE 1

| Deceleration | Operation basis | remarks |
| --- | --- | --- |
| deceleration ≤ 0.7 | Not operate | — |
| 0.7 < deceleration ≤ 1.3 | Allow to turn on | Need to turn off before deceleration < 0.7 m/s2 |
| 1.3 < deceleration | Need to turn on | |

Cases in which a brake lamp is turned on/off according to the regulation will be described below with reference to FIG. 3. FIG. 3 is a diagram for explaining a vehicle deceleration and whether a brake lamp is turned on or off according to the regulation of a regenerative braking device according to the prior art.

Referring to FIG. 3, a brake lamp based on regenerative braking is operated by setting an off threshold 'α' and an on threshold 'β' within a regulatory reference. The corresponding reference is determined using a test in consideration of the safety of a driver of a rear vehicle. In particular, a hysteresis margin 'Δ' corresponding to a difference between α and β is applied, and thus, when a vehicle deceleration through regenerative braking is changed in the vicinity of a reference deceleration, it is possible to prevent the brake lamp from being frequently turned on/off.

For example, as shown in FIG. 3, in a period ① in which a vehicle deceleration is equal to or greater than β, the brake lamp is turned off. A controller configured to determine whether the brake lamp is turned on/off through regenerative braking sets a request for turning on the brake lamp through regenerative braking in a period ② in which a vehicle deceleration is less than β, and resets the request for turning on the brake lamp in a period ③ in which the vehicle deceleration is reduced to α or less. As a result, a vehicle manufacturer generally intends to reduce chattering by tuning the aforementioned margin within the range (i.e., 0.7<deceleration≤1.3) in which a brake lamp is compelled to be turned on or off according to the regulations, and thus an on/off operation needs to be controlled based on deceleration detected by a vehicle.

In other words, a general vehicle that performs regenerative braking considers only an instantaneously detected deceleration but does not consider changing trends, etc. For example, when a driver depresses or engages an accelerator pedal all the way down (i.e., wide-open throttle (WOT)) and then abruptly increases the aforementioned coasting level, regulations are satisfied even if a brake lamp is not turned on until a deceleration reaches 1.3, the regulations are satisfied, but the total magnitude of deceleration is high during a procedure in which a strong acceleration is changed to a deceleration. In particular, even if a driver of a vehicle following a subject vehicle is capable of recognizing relatively high deceleration of the subject vehicle, a brake lamp of the subject vehicle may not be turned on (i.e., the brake lamp of the subject vehicle is guaranteed to be turned on only after a deceleration becomes greater than 1.3), and thus the driver may be confused and a serious collision may occur.

SUMMARY

Accordingly, the present disclosure is directed to a vehicle including an electric motor having improved operating performance and a method of controlling a brake lamp for the vehicle. In particular, the present disclosure provides a vehicle including an electric motor and a method of controlling a brake lamp for the vehicle, which control whether a brake lamp is turned on by correcting a deceleration based on various factors.

The technical problems solved by the exemplary embodiments are not limited to the above technical problems and other technical problems which are not described herein will become apparent to those skilled in the art from the following description. To achieve these objects and other advantages and in accordance with the purpose of the invention, as embodied and broadly described herein, a method of controlling a brake lamp of a vehicle including an electric motor as a power source may include determining a tendency of a driver, calculating a corrected mass based on the determined tendency of the driver, calculating corrected acceleration based on the corrected mass and regenerative braking torque of the electric motor, correcting an on threshold based on a difference between a requested torque and the regenerative braking torque when an accelerator pedal is released, and turning on the brake lamp based on the corrected on threshold and the corrected acceleration.

In another aspect of the present disclosure, a vehicle may include a brake lamp, an electric motor, and a controller configured to operate the brake lamp during regenerative braking through the electric motor in a state in which an accelerator pedal is released. The controller may include a driving tendency determiner configured to determine a tendency of a driver, a vehicle mass corrector configured to calculate a corrected mass based on the determined tendency of the driver, an acceleration corrector configured to calculate corrected acceleration based on the corrected mass and regenerative braking torque of the electric motor, and a brake lamp threshold corrector configured to correct an on threshold based on a difference between a requested torque and the regenerative braking torque at a time at which an accelerator pedal is released, and to turn on the brake lamp based on the corrected on threshold and the corrected acceleration.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION

Figure 1:
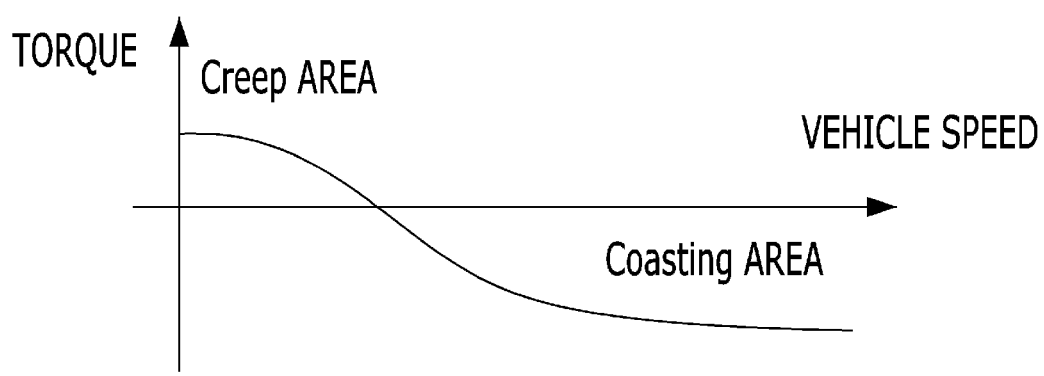
FIG. 1 is a diagram showing an example of a relationship between coasting torque and vehicle speed during coasting of a general vehicle according to the prior art.
Figure 2:
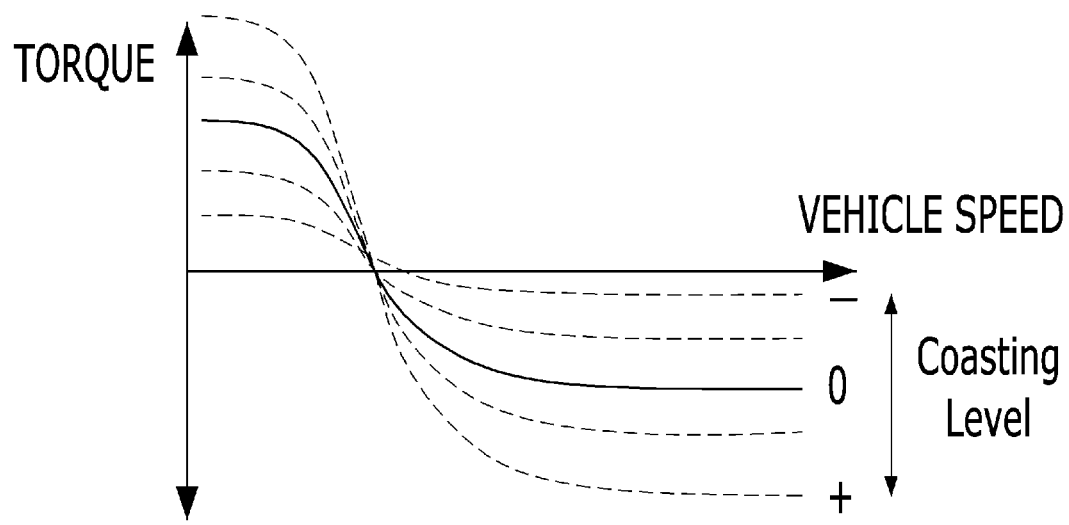
FIG. 2 is a diagram for explaining a concept of a general coasting level according to the prior art.
Figure 3:
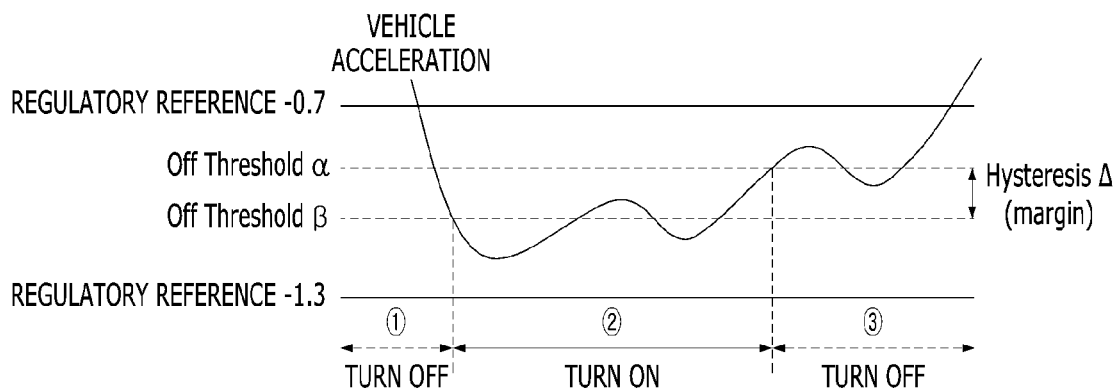
FIG. 3 is a diagram for explaining a vehicle deceleration and whether a brake lamp is turned on or off according to the regulation of a regenerative braking device according to the prior art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, the exemplary embodiments of the present disclosure will be described in detail with reference to the accompanying drawings so as to be easily implemented by those skilled in the art. However, the present disclosure may be variously implemented, and is not limited to the exemplary embodiments described herein. In the drawings, in order to clearly describe the present disclosure, portions which are not related to the description of the present disclosure will be omitted, and similar portions are denoted by similar reference numerals throughout the specification. The same reference numbers will be used throughout the drawings to refer to the same or like parts.

In the following description, needless to say, deceleration, which is a reference for turning on a brake lamp through regenerative braking, is also capable of being described as acceleration, obtained by changing the sign thereof. According to an embodiment of the present disclosure, a brake lamp illumination time may be effectively controlled by correcting acceleration and a threshold reference for turning on a brake lamp depending on the case. For example, acceleration may be corrected based on a driving tendency of a driver, and an on threshold may be corrected based on the difference between requested torque and actual output torque (i.e., regenerative braking torque) when the vehicle starts coasting.

Figure 4:
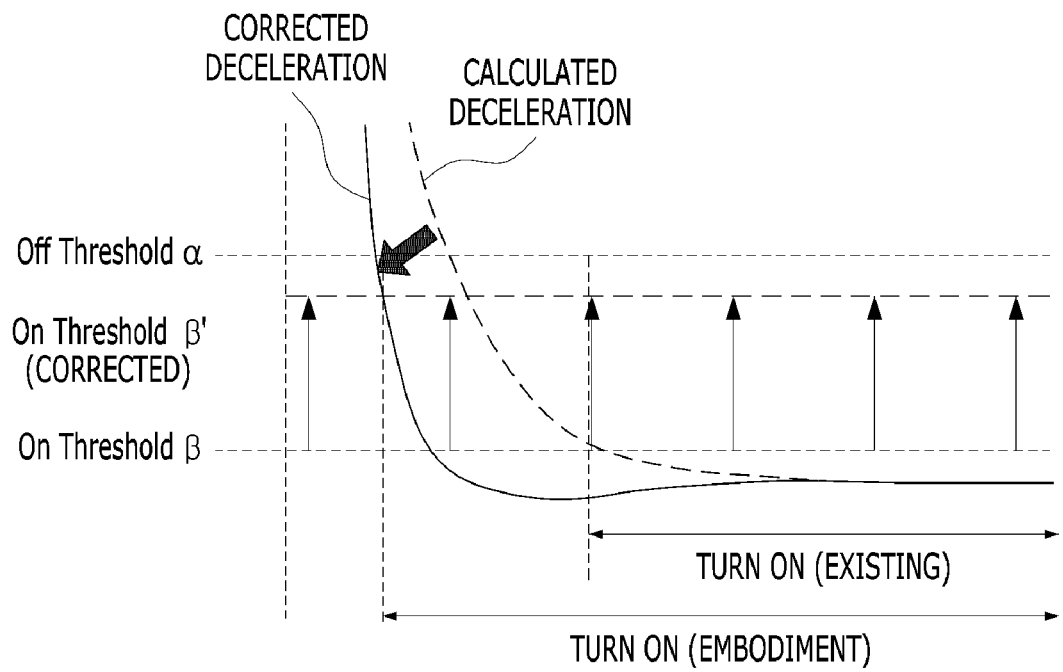
FIG. 4 is a diagram for explaining a concept of control for turning on a brake lamp according to an exemplary embodiment of the present disclosure.

FIG. 4 is a diagram for explaining a concept of control for turning on a brake lamp according to an exemplary embodiment of the present disclosure. Referring to FIG. 4, deceleration may be calculated according to the law of physics using the equation "F=ma" for calculating force as a function of mass and acceleration in addition to a value from an acceleration sensor in a general vehicle that performs regenerative braking, and deceleration calculated in this way may be referred to as "calculated deceleration (or calculated acceleration)". In particular, the force F may correspond to regenerative braking torque output from a motor, and the mass m ma correspond to the mass of the vehicle.

When control for turning on a brake lamp is performed using calculated deceleration during regenerative braking, it may not be desirable in the interests of safety to turn on a brake lamp only after deceleration changes substantially when acceleration suddenly changes as described above. Thus, according to an exemplary embodiment of the present disclosure, control for turning on a brake lamp may be performed using a "corrected deceleration" calculated by correcting a mass factor based on the driving tendency of the driver, in which case the brake lamp illumination time may also be advanced within the range that satisfies regulations by variably adjusting an on threshold 'β' to increase based on the regenerative braking torque.

Figure 5:
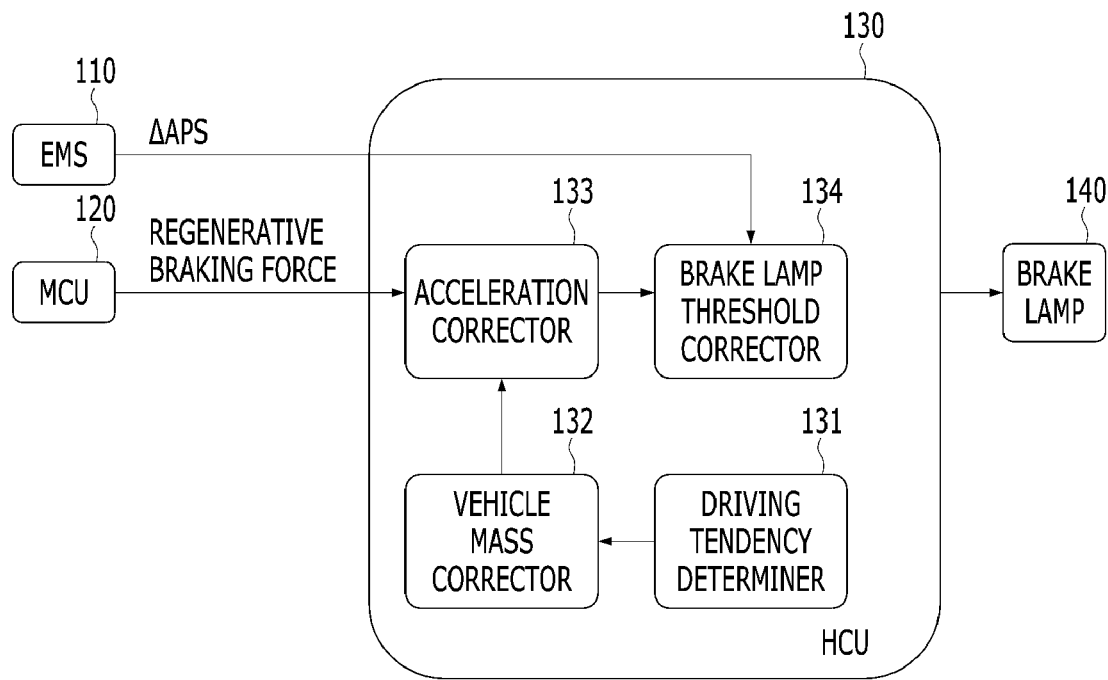
FIG. 5 shows an example of the configuration of a vehicle according to an exemplary embodiment of the present disclosure.

The configuration of a vehicle therefor will be described with reference to FIG. 5. FIG. 5 shows an example of the configuration of a vehicle according to an exemplary embodiment of the present disclosure.

The vehicle shown in FIG. 5 is assumed to be a hybrid vehicle, and a vehicle in which a brake lamp is operated by regenerative braking according to the present exemplary embodiment may include an engine management system (EMS) 110 configured to operate an engine (not shown), a motor control unit (MCU) 120 configured to operate an electric motor (not shown), and a controller 130 configured to turn on a brake lamp 140 through regenerative braking. Hereinafter, the controller 130 may be assumed to be a hybrid control unit (HCU) configured to execute the overall operation of a powertrain installed in the hybrid vehicle.

The EMS 110 may be configured to receive an accelerator pedal manipulation degree from an accelerator position sensor (APS) and a change AAPS therein may be provided to the hybrid controller 130. The MCU 120 may be configured to provide regenerative braking force output by a motor during regenerative braking, that is, regenerative torque information to the hybrid controller 130. The hybrid controller 130 may include a driving tendency determiner 131, a vehicle mass corrector 132, an acceleration corrector 133, and a brake lamp threshold corrector 134, and may be configured to turn on the brake lamp 140 by calculating corrected acceleration and varying an on threshold according to the exemplary embodiment as well as operating a general hybrid powertrain.

When the vehicle is an electric vehicle (EV) but not a hybrid vehicle, the configuration of FIG. 5 may be changed to be appropriate for the EV. For example, a function (i.e., providing AAPS) managed by the EMS 110 may also be managed by the MCU 120, and the hybrid controller 130 may be replaced with a vehicle control unit (VCU) configured to execute the overall operation of the powertrain of the EV. However, this is merely exemplary, and the present disclosure is not limited thereto. For example, the value of AAPS may also be calculated after the controller 130 directly receives a value of APS.

Hereinafter, the components 131, 132, 133, and 134 of the hybrid controller 130 will be described in more detail. The driving tendency determiner 131 may be configured to learn the manipulation pattern of an accelerator pedal and a brake pedal by a driver, whether a driving mode is selected, or the like and may be configured to determine a tendency of the driver in a plurality of stages (e.g., sporty, normal, or mild) based on a variation in acceleration of the vehicle. The vehicle mass corrector 132 may be configured to correct the mass of the vehicle, which is the basis for calculation of the acceleration, based on the tendency of the driver determined by the driving tendency determiner 131. First, the reason for calculation of the mass of the vehicle without consideration of an acceleration sensor will be described below.

In general, a communication delay (e.g., CAN delay) is present in a signal used in a vehicle, and when a sensor is used, filtering is generally performed on the signal, and thus a phase delay phenomenon occurs. In particular, a substantial phase delay phenomenon occurs when a sensor value is changed substantially, and thus reaction performance of turning on a brake lamp may be lowered. Thus, as the tendency of the driver is closer to being sporty, a variation in acceleration includes a greater amount of a high-frequency component, and when a filter is used, a filtering effect is improved, and thus a reaction speed may be further reduced. However, acceleration measurement generally includes noise, and thus the filter is inevitably used.

To overcome this, according to the present exemplary embodiment, compensation using a mass may be used to calculate acceleration using regenerative braking torque having relatively low noise. In particular, acceleration is inversely proportional to mass for the same generated braking torque according to the law of acceleration (F=ma), and thus the vehicle mass corrector 132 may be configured to overcompensate for a change in acceleration due to torque by reducing the mass of the vehicle ($m_{mody}$<m), used to calculate the acceleration, which will be described with reference to FIG. 6.

Figure 6:
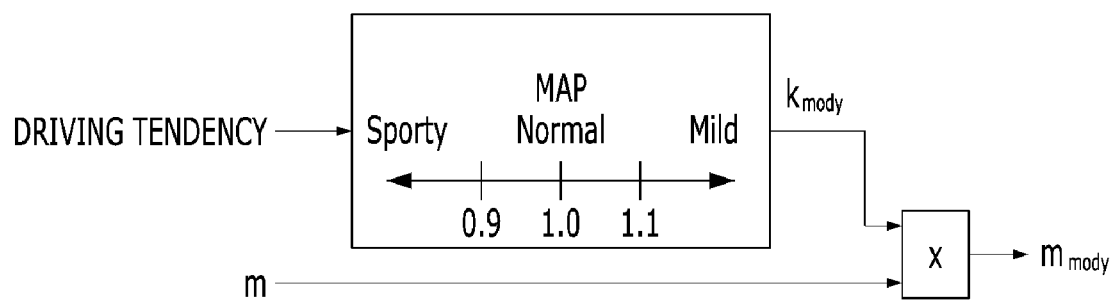
FIG. 6 is a diagram for explaining an operation of a vehicle mass corrector according to an exemplary embodiment of the present disclosure.

FIG. 6 is a diagram for explaining an operation of a vehicle mass corrector according to an exemplary embodiment of the present disclosure. Referring to FIG. 6, the vehicle mass corrector 132 may be configured to calculate a correction coefficient based on a map formed by matching a correction coefficient $k_{mody}$ with each driving tendency, and a corrected mass $m_{mody}$ may be calculated by reapplying the correction coefficient to the mass of the vehicle. Particularly, the map formed by matching the correction coefficient $k_{mody}$ with each driving tendency may be configured to reduce the corrected mass compared with the actual mass as the tendency of the driver becomes sporty.

Figure 7:
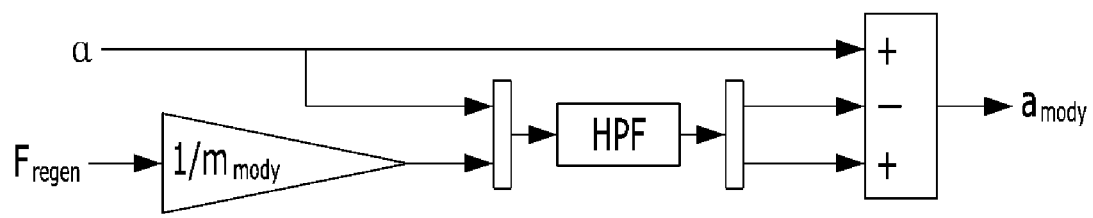
FIG. 7 is a diagram for explaining an operation of an acceleration corrector according to an exemplary embodiment of the present disclosure.

Hereinafter, the acceleration corrector 133 will be described with reference to FIG. 7. FIG. 7 is a diagram for explaining the operation of an acceleration corrector according to an exemplary embodiment of the present disclosure. Referring to FIG. 7, the acceleration corrector 133 may be configured to output only a high-frequency component by applying a high pass filter HPF to a value obtained by dividing regenerative braking torque $F_{regen}$ by the corrected mass $m_{mody}$ calculated by the vehicle mass corrector 132 and may be configured to calculate corrected acceleration $a_{mody}$ by applying the output high-frequency component to an original acceleration.

Figure 8:
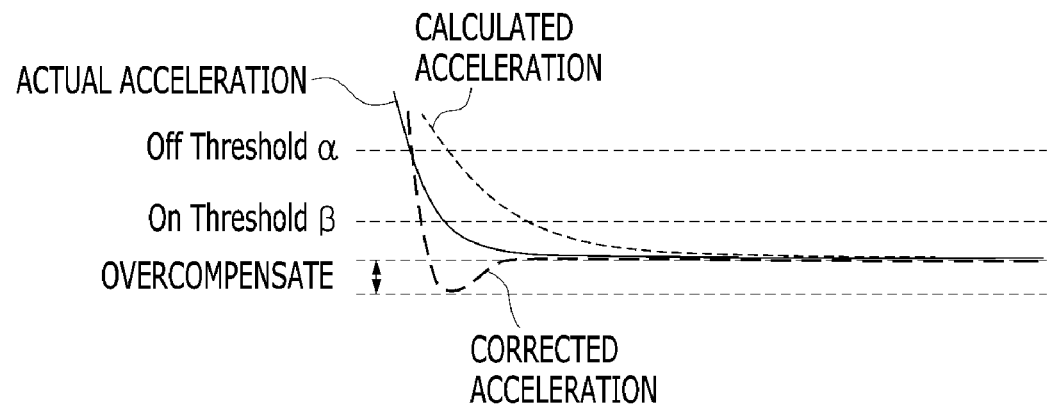
FIG. 8 is a diagram for explaining an effect of corrected acceleration according to an exemplary embodiment of the present disclosure.
Figure 8:
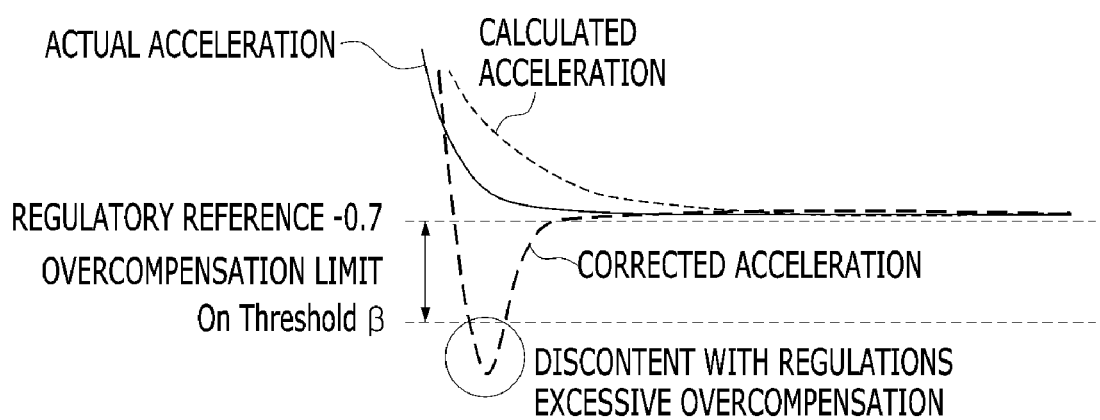

The effect and the problem when the corrected acceleration is applied will be described with reference to FIG. 8. FIG. 8 is a diagram for explaining the effect of acceleration correction according to an exemplary embodiment of the present disclosure. First, referring to the upper graph of FIG. 8, corrected acceleration $a_{mody}$ is overcompensated for only when a variation in torque by a HPF is high, and thus it may be possible to preemptively turn on a brake lamp, but acceleration is not compensated for in a general situation in which acceleration is varied through an HPF, and thus the acceleration may converge on acceleration prior to compensation (i.e., a calculated acceleration). However, a problem due to overcompensation may also occur.

Referring to a lower graph of FIG. 8, when there is no overcompensation limit, if an actual acceleration does not reach −0.7 and a brake lamp should not be illuminated according to regulations, corrected acceleration also reaches an on threshold β, and thus the brake lamp is illuminated. Accordingly, according to the present exemplary embodiment, the vehicle mass corrector 132 may be configured to calculate the corrected mass $m_{mody}$ in such a way that an overcompensation amount at which a variation in torque is highest does not exceed a difference (i.e., a "overcompensation limit" in the lower graph of FIG. 8) between an off threshold according to regulations (i.e., deceleration of 0.7) and an on threshold β.

Figure 9:
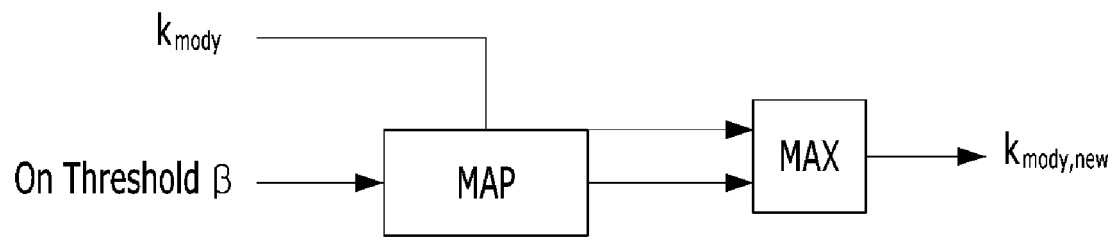
FIG. 9 is a diagram showing an example of the configuration of a limit in a correction amount of a mass corrector according to an exemplary embodiment of the present disclosure.

A method of setting such an overcompensation limit will be described with reference to FIG. 9. FIG. 9 is a diagram showing an example of the configuration of a limit in a correction amount of a mass corrector according to an exemplary embodiment of the present disclosure.

The vehicle mass corrector 132 may be configured to calculate a corrected mass $m_{mody}$ based on a corrected correction coefficient $k_{mody,new}$ instead of a correction coefficient $k_{mody}$ of FIG. 6 by adding the logic shown in FIG. 9 to an output end of the correction coefficient $k_{mody}$ calculated for each driving tendency among the logics described above with reference to FIG. 6. In particular, the correction coefficient $k_{mody}$ calculated for each driving tendency may be applied to a map based on an on threshold β, a value obtained by applying the map may be compared with the correction coefficient $k_{mody}$ calculated for each driving tendency, and the greater value through the comparison may be determined as the corrected correction coefficient $k_{mody,new}$. The map may be generated based the characteristics of the vehicle (e.g., an empty vehicle weight, a loss factor of a driving system with respect to regenerative braking torque, etc.) in such a way that an overcompensation value obtained through correction of a mass does not exceed an overcompensation limit. A phenomenon unnecessary chattering of a brake lamp may be prevented, and discontent with regulations may also be prevented, by correcting the correction coefficient as described above.

Figure 10:
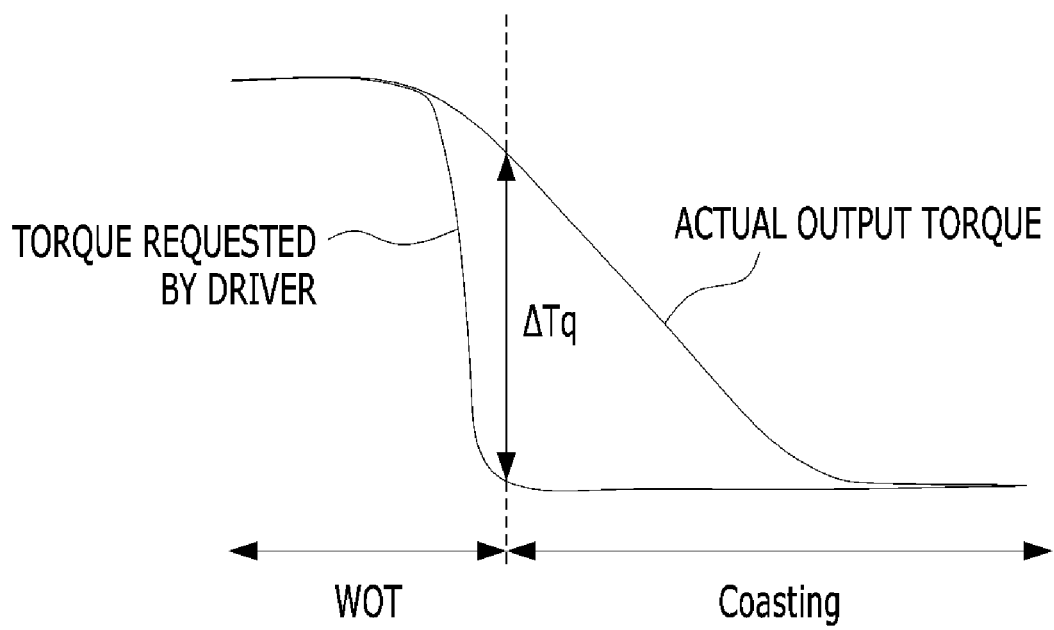
FIG. 10 is a diagram for explaining a change in torque through coasting conversion according to an exemplary embodiment of the present disclosure.

Hereinafter, the brake lamp threshold corrector 134 will be described with reference to FIGS. 10 and 11. FIG. 10 is a diagram for explaining a change in torque through coasting conversion.

Referring to FIG. 10, when torque requested by a driver (i.e., a manipulation amount of an accelerator pedal) is changed substantially, for example, at the time at which a vehicle enters coasting by releasing an accelerator pedal during wide-open throttle (WOT) by manipulating the accelerator pedal, the vehicle may gradually control a change in output torque based on a change in requested torque. In particular, when the change in requested torque is applied without correction, driving characteristics need to be prevented from being degraded due to jerking, and a driving system needs to be prevented from being damaged, so filtering may be configured in different ways according to data (bandwidth) of an output source. The difference (i.e., $\Delta Tq$) between requested torque and actual output torque at the time at which an accelerator pedal is released may be increased substantially due to such filtering of requested torque.

The brake lamp threshold corrector 134 may be configured to correct the on threshold $\beta$ based on the difference $\Delta Tq$ with torque at the time at which an accelerator pedal is released, which will be described with reference to FIG. 11. FIG. 11 is a diagram for explaining an operation of a brake lamp threshold corrector according to an exemplary embodiment of the present disclosure.

Figure 11:
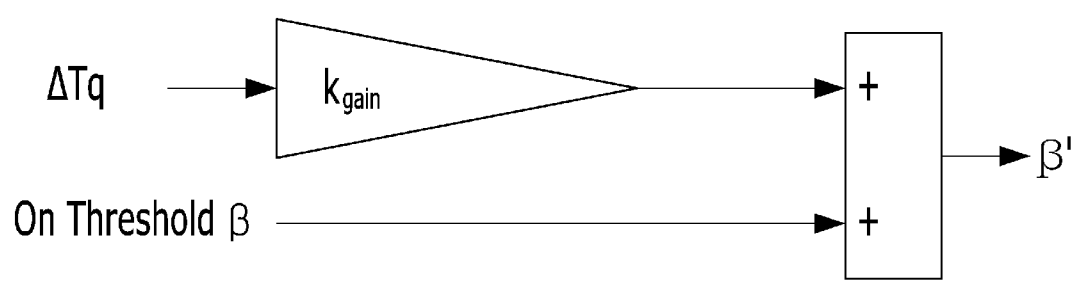
FIG. 11 is a diagram for explaining an operation of a brake lamp threshold corrector according to an exemplary embodiment of the present disclosure.

Referring to FIG. 11, the brake lamp threshold corrector 134 may be configured to calculate a corrected threshold $\beta'$ by performing correction to increase the on threshold $\beta$ as much as a value obtained by applying a gain coefficient $k_{gain}$ to the difference $\Delta Tq$ between requested torque and actual output torque at the time at which an accelerator pedal is released. In particular, the gain coefficient $k_{gain}$ may be determined using a map determined by experimentation with respect to $\Delta Tq$, and correction to an off threshold $\alpha$ with respect to a maximum value of $\Delta Tq$ that a vehicle is allowed to have may be linearly applied in consideration of a predetermined margin. For example, the gain coefficient $k_{gain}$ may be determined according to Equation 1 below.

$$k_{gain} = \frac{\text{Threshold}_{off} - \text{Threshold}_{on} - \text{Threshold}_{margin}}{\Delta Tq_{max}} \quad \text{Equation 1}$$

In Equation 1 above, $\text{Threshold}_{off}$ is an on threshold $\alpha$, $\text{Threshold}_{on}$ is an on threshold $\beta$, $\text{Threshold}_{margin}$ is a margin, and $\Delta Tq_{max}$ is the maximum value of $\Delta Tq$ that a corresponding value is allowed to have. Correction may be performed only when $\Delta Tq$ is equal to or greater than a predetermined value (i.e., $\Delta Tq > \Delta Tq_{threshold}$).

When a predetermined condition is satisfied, the brake lamp threshold corrector 134 may be configured to restore the corrected threshold $\beta'$ to the original on threshold $\beta$. The restoration condition correspond to 1) the case in which a brake lamp is turned on by the corrected threshold $\beta'$, and this is because, even if restoration of the on threshold $\beta$ is performed after the brake lamp is turned on, deceleration is within a hysteresis section and thus does not affect the operation of the brake lamp. Another condition corresponds to 2) the case in which the torque requested by the driver and the actual output torque reach the aforementioned $\Delta Tq_{threshold}$, and in this case, the actual output torque becomes similar to the corrected threshold $\beta'$, and thus is restored to prevent chattering.

Figure 12:
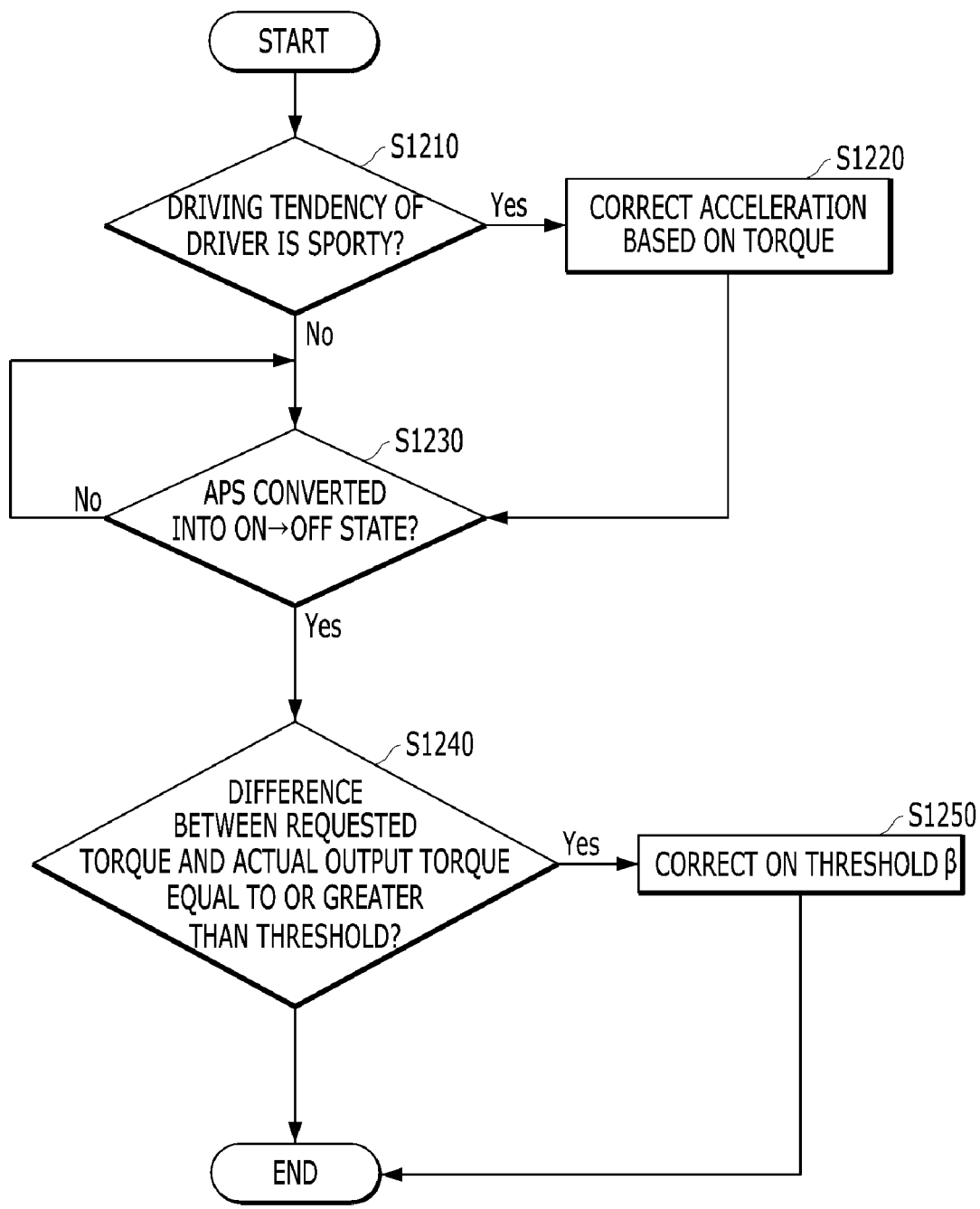
FIG. 12 is a flowchart showing an example of a problem of controlling a brake lamp according to an exemplary embodiment of the present disclosure.

A flowchart of the aforementioned procedure of controlling a brake lamp is illustrated in FIG. 12. FIG. 12 is a flowchart showing an example of a problem of controlling a brake lamp according to an exemplary embodiment of the present disclosure.

Referring to FIG. 12, whether correction of a mass by the vehicle mass corrector 132 is to be applied may be determined to calculate acceleration based on regenerative braking torque by the acceleration corrector 133 based on the tendency of the driver determined by the driving tendency determiner 131. For example, when the driving tendency of the driver is sporty (YES of S1210), correction of a mass may be applied to calculation of acceleration based on regenerative braking torque (S1220).

When manipulation of an accelerator pedal is released (i.e., APS on->off, YES of S1230), if the difference $\Delta Tq$ between the requested torque at a corresponding time and actual output torque is equal to or greater than a threshold $\Delta Tq_{threshold}$ (YES of S1240), an on threshold may be corrected to increase (S1250). The upward correction S1250 may be configured by applying the gain coefficient $k_{gain}$ according to the aforementioned Equation 1, and operation S1240 may be omitted in some exemplary embodiments.

A vehicle related to at least one exemplary embodiment of the present disclosure as configured above may effectively control a brake lamp illumination time by correcting acceleration and an on threshold depending on the cases.

It will be appreciated by persons skilled in the art that that the effects that could be achieved with the present disclosure are not limited to what has been particularly described hereinabove and other advantages of the present disclosure will be more clearly understood from the detailed description.

The invention may also be embodied as computer readable code on a non-transitory computer readable recording medium. The non-transitory computer readable recording medium is any data storage device configured to store data which may thereafter be read by a computer system. Examples of the non-transitory computer readable recording medium include read-only memory (ROM), random-access memory (RAM), CD-ROMs, magnetic tapes, floppy disks, and optical data storage devices.

The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method of controlling a brake lamp of a vehicle comprising an electric motor as a power source, comprising:
   determining, by a controller, a tendency of a driver;
   calculating, by the controller, a corrected mass based on the determined tendency of the driver;
   calculating, by the controller, corrected acceleration based on the corrected mass and regenerative braking torque of the electric motor;
   correcting, by the controller, an on threshold based on a difference between a requested torque and the regenerative braking torque at a time at which an accelerator pedal is released; and
   turning on, by the controller, the brake lamp based on the corrected on threshold and the corrected acceleration.

2. The method of claim 1, wherein the calculating the corrected mass includes applying a correction coefficient, which is changed to be reduced as the determined tendency of the driver is sporty, to a mass of the vehicle prior to correction.

3. The method of claim 2, wherein the correction coefficient is adjusted based on the on threshold.

4. The method of claim 3, wherein the correction coefficient is adjusted by limiting a compensation amount of the corrected acceleration based on the corrected mass.

5. The method of claim 4, wherein the compensation amount is limited to adjust a magnitude of the compensation amount to be within a difference between the on threshold and a first acceleration at which the brake lamp is turned off.

6. The method of claim 1, wherein the calculating the corrected acceleration is performed using a high-frequency component of a value obtained by dividing the regenerative braking torque by the corrected mass.

7. The method of claim 1, wherein the correcting the on threshold is performed when the difference between the requested torque and the regenerative braking torque at the time at which the accelerator pedal is released is equal to or greater than a preset reference.

8. The method of claim 1, wherein the correcting the on threshold includes adding a value, obtained by multiplying the difference between the requested torque and the regenerative braking torque at the time at which the accelerator pedal is released by a gain coefficient, to the on threshold.

9. The method of claim 8, wherein the gain coefficient is determined using a maximum torque difference for each vehicle, the on threshold, an off threshold, and a predetermined margin.

10. A non-transitory computer-readable recording medium having recorded thereon a program for executing the method of claim 1.

11. A vehicle comprising:
a brake lamp;
an electric motor; and
a controller configured to operate the brake lamp during regenerative braking through the electric motor when an accelerator pedal is released,
wherein the controller includes:
a driving tendency determiner configured to determine a tendency of a driver;
a vehicle mass corrector configured to calculate a corrected mass based on the determined tendency of the driver;
an acceleration corrector configured to calculate corrected acceleration based on the corrected mass and regenerative braking torque of the electric motor; and
a brake lamp threshold corrector configured to correct an on threshold based on a difference between a requested torque and the regenerative braking torque at a time at which an accelerator pedal is released, and to turn on the brake lamp based on the corrected on threshold and the corrected acceleration.

12. The method of claim 11, wherein the vehicle mass corrector is configured to calculate the corrected mass by applying a correction coefficient, which is changed to be reduced as the determined tendency of the driver is sporty, to a mass of the vehicle prior to correction.

13. The method of claim 12, wherein the correction coefficient is adjusted based on the on threshold.

14. The method of claim 13, wherein the correction coefficient is adjusted by limiting a compensation amount of the corrected acceleration based on the corrected mass.

15. The method of claim 14, wherein the compensation amount is limited to cause a magnitude of the compensation amount to be within a difference between the on threshold and a first acceleration at which the brake lamp is turned off.

16. The method of claim 11, wherein the acceleration corrector is configured to calculate the corrected acceleration using a high-frequency component of a value obtained by dividing the regenerative braking torque by the corrected mass.

17. The method of claim 11, wherein the brake lamp threshold is corrected when the difference between the requested torque and the regenerative braking torque at the time at which the accelerator pedal is released is equal to or greater than a preset reference.

18. The method of claim 11, wherein the brake lamp threshold corrector is configured to correct the on threshold by adding a value, obtained by multiplying the difference between the requested torque and the regenerative braking torque when the accelerator pedal is released by a gain coefficient, to the on threshold.

19. The method of claim 18, wherein the gain coefficient is determined using a maximum torque difference for each vehicle, the on threshold, an off threshold, and a predetermined margin.

* * * * *